United States Patent Office 3,447,662
Patented June 3, 1969

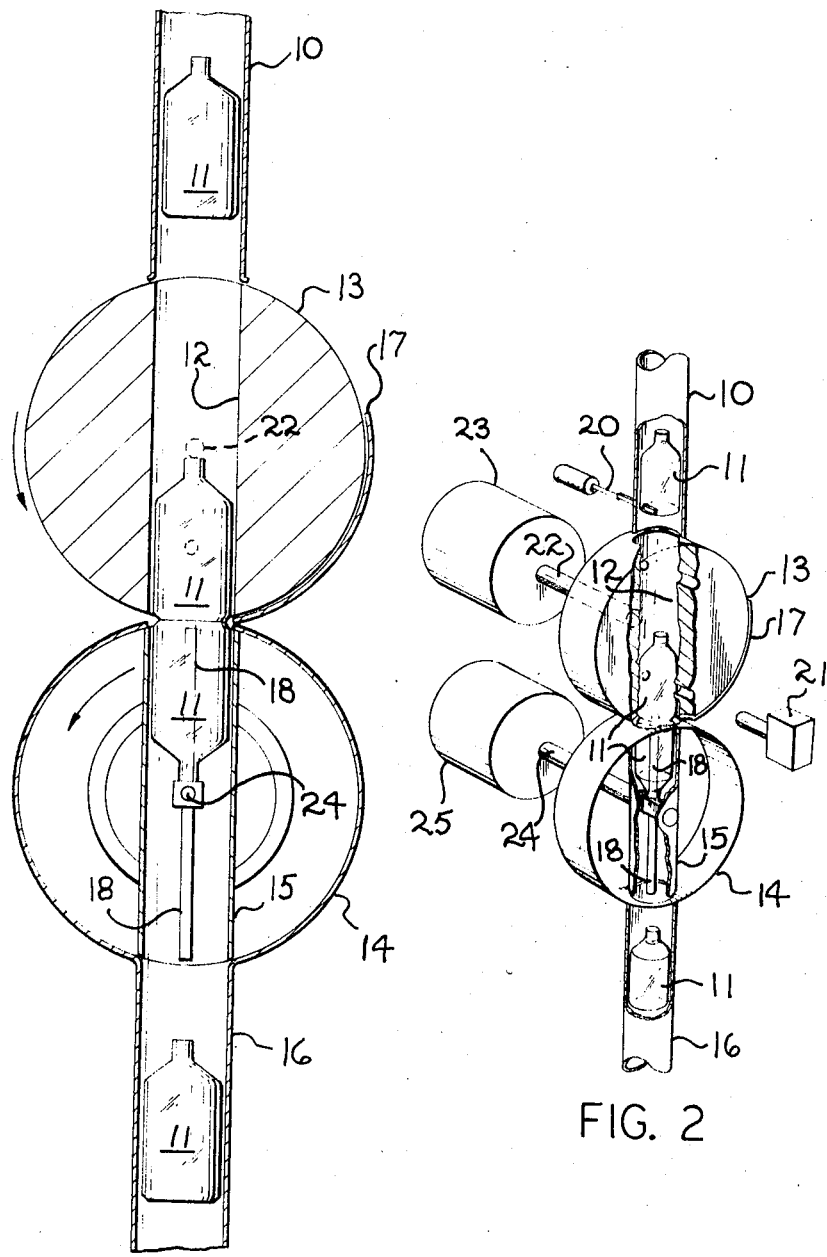

3,447,662
BOTTLE ORIENTING MECHANISM
Ronald A. House, 1504 Heatherton Drive,
Toledo, Ohio 43614
Filed Jan. 2, 1968, Ser. No. 694,618
Int. Cl. B65g 47/24
U.S. Cl. 198—33
10 Claims

ABSTRACT OF THE DISCLOSURE

Apparatus for orienting bottles including a disc capable of rotation equipped with pockets to receive randomly-oriented bottles. A rotating wheel containing radially aligned pegs to receive neck-down bottles from the pockets of the rotatable wheel. Neck-up bottles that will not fit over a peg of the rotating wheel are, in one embodiment, reversed so that they will be neck-down hence fit over the pegs; and in another embodiment, the neck-up bottles bypass the pegged rotating wheel by means of a chute.

---

The present invention relates to automatic apparatus for orienting containers or like articles, more particularly the present invention relates to apparatus for automatically orienting a series of containers, each consisting of a larger main body portion and a smaller neck portion attached to the open end of the main larger body.

While not specifically restricted thereto, the present invention is especially useful for orienting lightweight plastic bottles preparatory to packaging thereof or filling and capping the same.

The ever-expanding acceptance of the packaging of liquid and solid products in plastic bottles has made it manditory that there be provided a dependable, simple, rapidly operating substantially automatic means for orienting a continuous flow of plastic bottles.

It is therefore a primary object of the present invention to provide an uncomplicated economical apparatus for automatically orienting a continuous stream of neck containing containers preparatory to the shipment or filling of such containers.

Another object of the present invention is to provide an apparatus that will restrict haphazard random bouncing of an inherently resilient plastic bottle while it is being oriented by said apparatus.

An additional object of this invention is to orient each bottle that arrives at the apparatus without causing said bottle to be returned at a later time.

A further object of the present invention resides in a wheel having circumferentially spaced radial pockets for the reception of bottles to avoid any jamming of the orienting device.

It is an object of the present invention to provide apparatus wherein bottles delivered to said apparatus in a first predetermined orientation are advanced, and those bottles delivered to said apparatus in a second predetermined orientation are rotated into said first predetermined orientation before being subsequently advanced.

With these and other objects in mind, the present invention contemplates a bottle orienting apparatus having delivery means for conveying randomly oriented bottles to said apparatus. The bottles are then fed sequentially into a pocket containing wheel capable of rotation. In one embodiment of the present invention bottles that enter the pocket of the rotatable wheel in an upright position cannot exit from the wheel until the wheel is rotated through 180°. The thus inverted bottle will move onto a peg of an adjacent wheel which in turn rotates the bottle through 180° thus causing it to depart from the orienting apparatus in an upright position. Those containers passing into the rotatable wheel in an inverted position will pass entirely through said wheel and become lodged on one of the pegs of the rotatable wheel whereupon subsequent rotation through 180° will place the bottle in an upright position. In another embodiment of the invention bottles that enter the pockets neck end up are rotated through approximately 180° and are deposited on radially aligned pegs of a second rotatable wheel that in turn rotates the bottle through an additional 180° thus depositing the bottle in an upright attitude into an egress chute. Bottles that are neck end down when entering one of the pockets in said rotating discs are rotated more than 180° whereupon they are deposited in an upright attitude in a second egress chute.

The above-briefly described bottle orienting apparatus will become more readily apparent to those skilled in the art from the embodiments thereof shown in the accompanying drawings and from the subsequent written description.

In the drawings:

FIG. 1 is an elevational sectional view of one embodiment of the present invention;

FIG. 2 is a partly broken away and sectioned perspective view of the apparatus shown in FIG. 1;

Figures 3, 4:
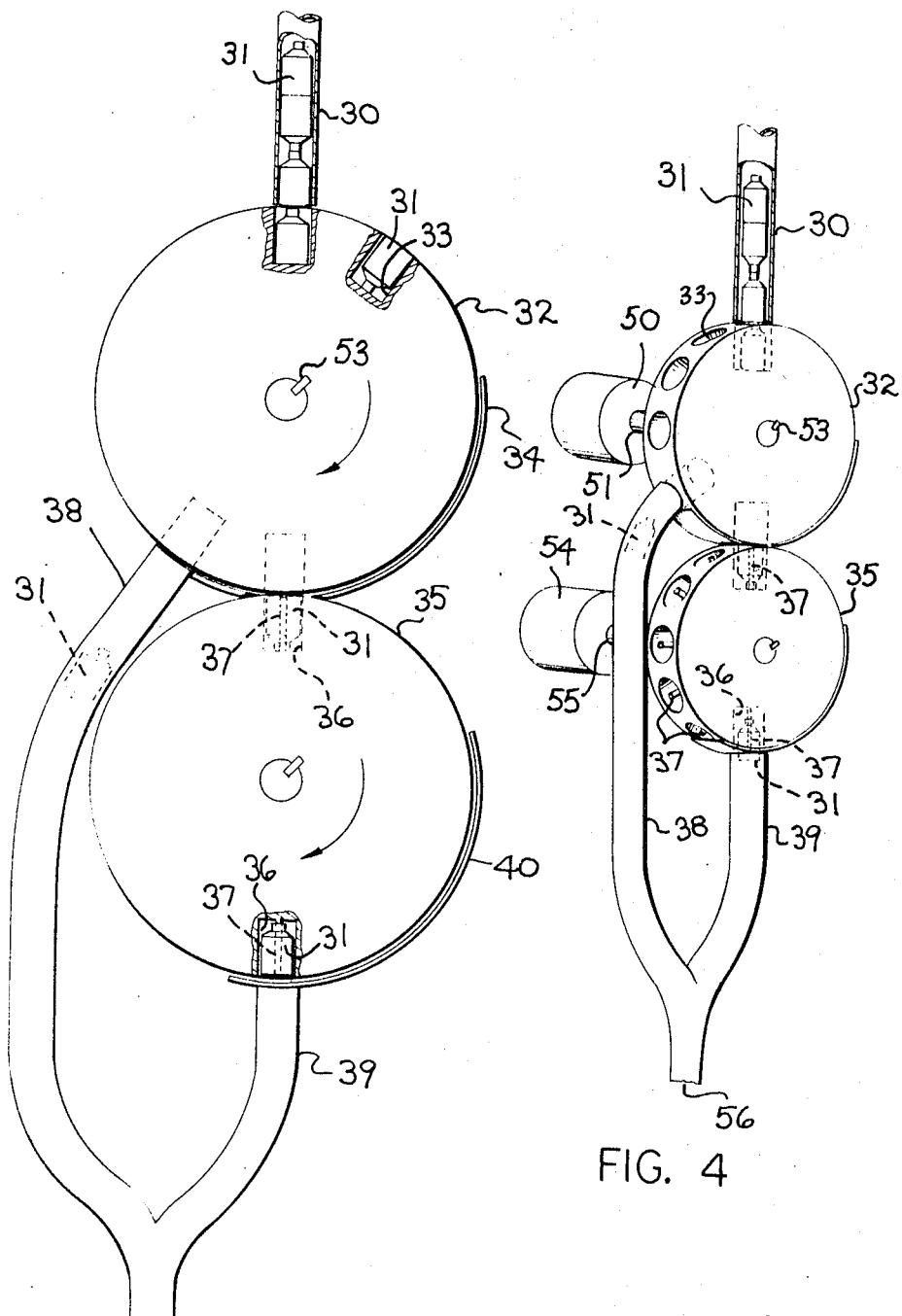
FIG. 3 is an elevational sectional view similar to FIG. 1 except that it depicts another embodiment of the invention.
FIG. 4 is a partly broken away perspective view of the embodiment shown in FIG. 3.

Generally stated, the present invention is designed specifically for light-weight bottles; however, it is quite recognizable by those skilled in the art that it would work equally well for containers of heavier density such as glass and metal.

The present invention is considered to be an improvement over article sorting apparatus described in United States Patent 2,264,105, dated Nov. 23, 1941, wherein a plurality of tangentially aligned pocket containing wheels are utilized to orient parts for machine tools. Also, the present invention provides an orienting apparatus for bottles that differs significantly from the orienting devices described in United States Patents 2,630,221 and 3,166,177 which issued respectively on Mar. 3, 1953 and Jan. 19, 1965.

Referring to the drawings with particular reference to FIG. 1, there is shown a supply tube 10 which is just slightly larger in internal diameter than the randomly oriented bottles 11 that pass therethrough as they arrive at the orienting apparatus. Bottle 11 moves from the supply tube 10 into an annularly shaped cavity 12 that extends diametrically through a rotatable wheel 13. Cavity 12 like tube 10 is also slightly larger in overall cross-sectional area than bottle 11. When bottle 11 is neck-side up, its progress through wheel 13 is stopped by the bottom thereof coming in contact with an upwardly protruding peg 18. Peg 18 is one of a plurality of similar radially aligned pegs mounted for rotation within a stationary shield 14. Shield 14 is positioned so that its periphery is continguous with the periphery of rotatable wheel 13. As previously pointed out when bottle 11 is neck-end up it is contained within rotatable wheel 13. As wheel 13 rotates through substantially 180°, bottle 11 is inverted and it will pass entirely through wheel 13 since the opening of the bottle is aligned with peg 18. Bottle 11 proceeds to slide down over peg 18 until the entirety of bottle 11 is within the confinement of stationary shield 14. An arcuate bottle restraining member 17 is positioned adjacent a portion of wheel 13 to prevent bottle 11 from exiting from cavity 12 when wheel 13 is rotated. Surrounding peg 18 is an annular restraining tubular member 15 that is also equipped to move simultaneously in an arcuate path within shield 14. Tubular member 15 provides the necessary stabilization to bottles 11 when they are constructed from light-weight plastic material.

The peg 18 upon which bottle 11 is positioned is permitted to rotate through substantially 180° thus once again positioning bottle 11 in an upright position. A discharge tube or chute 16 aids in removing the oriented bottle from the overall apparatus.

When a bottle 11 arrives via delivery tube 10 to wheel 13 in an inverted position, it will pass entirely through cavity 12 of wheel 13 and deposit itself upon peg 18 whereupon it will be rotated through substantially 180° so that it may exit into discharge tube 16 in an upright attitude.

FIG. 2 shows perspectively and in more detail the heretofore described bottle orienting apparatus. Working in a reciprocating motion is bottle retainer 20 which protrudes into the cavity or passageway of delivery tube 10. By the proper movement of retainer 20 one bottle at a time can be metered into rotatable wheel 13. If bottle 11 is in an upright position, it will stop within the confinement of wheel 13. The position of bottle 11 within wheel 13 is then detected by an electric eye 21 or other sensory means. Once the continued presence of bottle 11 is recorded by electric eye 21, a signal is sent to motor 23 so that it may rotate shaft 22 which supports and rotates wheel 13. As bottle 11 passes within the confinement of fixed shield 14, the electric eye 21 will so signal the complete passage of bottle 11 so that electric motor 25 can be activated, thus causing shaft 24 to rotate and deliver bottle 11 to delivery tube 16. As shaft 24 completes its prescribed rotation bottle retainer 20 will permit another bottle 11 to enter wheel 13. Should the bottle 11 be neckdown, it will pass quite quickly through cavity 12 in wheel 13. The electric eye, however, detects the passage of bottle 11 and activates motor 25. Motor 23 need not be activated for rotation of disc 13 unless there is a sustained detection by electric eye 21 of a bottle 11 within cavity 12. It will be apparent that other detection means and drive means could be equally well employed.

FIG. 3 is an elevational sectional view of another embodiment of the present invention. A bottle delivery tube 30 carries randomly oriented bottles 31 to the zenith of pocketed wheel 32. Wheel 32 is adapted for rotation and contains a plurality of circumferentially spaced radially aligned pockets or cavities 33. Each cavity 33 is large enough to accommodate a single bottle. Cavities 33 have a depth that is approximately the same as the overall length of bottle 31. By closely regulating the depth of pockets 33, additional bottles can be prevented from entering cavity 33, thus assuring the rotational capacity of wheel 32. As wheel 32 rotates, for example, in a clockwise direction, bottles 31 will be translated from a substantially vertical position to a horizontal position. A fixed guide 34 is located in a very close proximity to the periphery of wheel 32. Guide 34 thus prevents bottles 31 from exiting from individual cavities 33. The combination of wheel 32 and guide 34 permits bottles 31 to be moved to the nadar or bottom most position of the path through which wheel 31 rotates.

A second wheel 35 is positioned below wheel 32 so that its periphery is contiguous with the periphery of wheel 32. Wheel 35 contains cavities 36 which are aligned in similar fashion to the cavities 33 in wheel 32. Located in the center of cavities 36 are pegs 37 which are in radial alignment and extend approximately to the outer extremity of wheel 35. As bottles 31 are translated to a position near the bottom of wheel 32, bottles 31 will one by one move to a new position in the cavities 36 of wheel 35 provided that they are in a neck-down position. The bottles that are neck-down move over the pegs 37 of wheel 35. The bottles that arrive at the bottom of wheel 32 in an upright position are prevented from entering cavities 36 of wheel 35 since the bottom of the bottle is supported by the top of peg 37. Bottles that are prevented from entering cavities 36 by virtue of their upright position are further moved in a clockwise direction until they arrive at exit chute 38. The upright bottle 31 then moves downward through chute 38.

The bottles that move into position over pegs 37 in cavities 36 are then translated arcuately until they arrive at a position near the bottom arcuate sweep of wheel 35. The bottle is then free to exit into chute 39. A guide 40 of arcuate configuration is positioned around a portion of the arcuate extent of wheel 35 to prevent bottles 31 from falling out of cavities 36 before they arrive at exit chute 39.

FIG. 4 is a perspective view partly in section which shows bottles 31 arriving in random orientation at the top of wheel 32. Wheel 32 is powered by motor 50 which is coupled thereto by shaft 51. A simple key arrangement 53 may be employed to assure proper orientation of motor 50 and wheel 32. Wheel 35 is likewise driven by a motor 54 which in turn utilizes shaft 55 to rotate wheel 35. It will be apparent to those skilled in the art that motors 50 and 54 can be regulated so that cavities 33 of wheel 32 will always coincide with cavities 36 of wheel 35. In place of two motors a belt arrangement could equally well be employed to rotate both wheels 32 and 35 from a single power source. FIG. 4 also shows how bottles 31 are routed to a common terminal point 56 via chutes 38 and 39.

The aforegoing written description makes it apparent that the embodiments set forth bottle orienting apparatus that will accept all bottles no matter how they are oriented and discharges them continuously in one direction in the desired orientation without requiring the recycle of any parts not correctly oriented.

The present invention is advantageous in feeding small as well as large plastic bottles to a filling station where correct orientation of the bottle is a prerequisite to filling.

While certain representative embodiments and details have been shown for the purpose of illustrating the invention, it will be apparent to those skilled in this art that various changes and modifications may be made therein without departing from the spirit or scope of the invention.

What is claimed is:

1. An apparatus for orienting a series of articles having one end open and of smaller cross-sectional dimensions than the closed opposite end, said apparatus comprising: a first rotating member having at least one article receiving cavity positioned therein, an article ingress means positioned adjacent said first rotating member so that the interior of said means can communicate with said cavity, a second rotating member having at least one radially aligned pin adapted to move into alignment with said first member cavity for the reception of said article, and egress means positioned at least adjacent said second rotating member to receive and convey said articles away from said apparatus in an oriented fashion.

2. An apparatus for orienting a series of hollow articles having one end open and of substantially smaller cross-sectional dimensions than the closed opposite end, said apparatus comprising: a first rotating member mounted for rotation about an axis of symmetry, an annular cavity passing through said first member normal to said axis of rotation, said cavity being open at both ends, an article ingress means positioned adjacent said first rotating member so that the interior of said means can communicate with said cavity, a second rotating member having a plurality of radially aligned pegs adapted to move into alignment with said first member cavity for the reception of said articles, and egress means positioned at least adjacent said second rotating member to receive and convey said articles away from said apparatus in an oriented fashion.

3. An apparatus as claimed in claim 2 wherein the annular cavity that passes through said first member is diametrically aligned.

4. An apparatus as claimed in claim 2 wherein the pegs of said second rotating member are surrounded by an elongate annular member that helps stabilize said articles during translation.

5. An apparatus as claimed in claim 2 wherein said second rotating member and said surrounding elongate annular member rotate within an annular fixed position article restricting shield.

6. An apparatus as claimed in claim 2 wherein article restricting means is associated with said article ingress means to permit a one by one flow of articles to said first rotating member.

7. An apparatus as claimed in claim 2 wherein detection means is employed with said first rotating member to detect whether an article is lodged therein.

8. An apparatus for orienting a series of hollow articles having one end open and of substantially smaller cross-sectional dimensions than the closed opposite end, said apparatus comprising: a first rotating member mounted for rotation about an axis of symmetry, a plurality of circumferentially spaced radially aligned open end annular cavities contained in the periphery of said first rotating member, an article ingress means positioned adjacent said first rotating member so that the interior of said means can communicate with said cavities, a second rotating member having a plurality of cavities each containing circumferentially spaced radially aligned pegs adapted to move into alignment with the cavities of said first rotating member for the reception of said articles, and egress means associated with both said first and second rotating members to receive and convey said articles away from said apparatus in an oriented fashion.

9. An apparatus as claimed in claim 8 wherein said first and second rotating members have an article restricting guide positioned contiguously over at least a portion of the annular extent of the peripheries of said members to prevent said articles from exiting from said apparatus other than said egress means.

10. An apparatus as claimed in claim 8 wherein said egress means is formed from tubular members joined one to the other to form a single discharge for oriented articles.

References Cited

UNITED STATES PATENTS

| | | | |
|---|---|---|---|
| 3,035,681 | 5/1962 | Bennett | 221—173 X |
| 3,166,177 | 1/1965 | Laverty | 221—172 X |

STANLEY H. TOLLBERG, *Primary Examiner.*